United States Patent
Plate

(10) Patent No.: US 6,499,184 B2
(45) Date of Patent: Dec. 31, 2002

(54) ELASTOMERIC BIASED CASTER

(75) Inventor: Jack R. Plate, Clarklake, MI (US)

(73) Assignee: Ross Design & Engineering, Inc., Cement City, MI (US)

( * ) Notice: Subject to any disclaimer, the term of this patent is extended or adjusted under 35 U.S.C. 154(b) by 0 days.

(21) Appl. No.: 09/853,795

(22) Filed: May 14, 2001

(65) Prior Publication Data
US 2002/0166201 A1 Nov. 14, 2002

(51) Int. Cl.7 .......................... B60B 33/00; B60B 33/04
(52) U.S. Cl. ........................... 16/44; 16/18 R; 16/35 D; 16/19; 16/29
(58) Field of Search ...................... 16/44, 35 D, 18 R, 16/29, 19

(56) References Cited

U.S. PATENT DOCUMENTS

| 1,745,992 | A | * | 2/1930 | Herold | 16/44 |
| 1,958,905 | A | * | 5/1934 | Anderson | 16/44 |
| 2,285,656 | A | * | 6/1942 | Herold | 16/44 |
| 2,442,831 | A | * | 6/1948 | Suttles | 16/31 R |
| 2,581,912 | A | * | 1/1952 | Brown | 16/44 |
| 2,700,173 | A | * | 1/1955 | Huffman | 16/31 R |
| 3,041,656 | A | * | 7/1962 | Goodall | 16/31 R |
| 3,178,758 | A | * | 4/1965 | Patterson | 152/42 |
| 3,518,714 | A | * | 7/1970 | Hager | 16/35 D |
| 4,312,096 | A | * | 1/1982 | Schubert et al. | 16/44 |
| 4,346,498 | A | * | 8/1982 | Welsch et al. | 16/44 |
| 4,462,138 | A | * | 7/1984 | Black | 16/44 |
| 4,485,521 | A | * | 12/1984 | Welsch et al. | 16/44 |
| 4,559,669 | A | * | 12/1985 | Bonzer et al. | 16/44 |
| 5,305,496 | A | * | 4/1994 | Gagnon et al. | 16/44 |
| 5,448,796 | A | | 9/1995 | Larson | |
| 6,279,199 | B1 | * | 8/2001 | Plate | 16/19 |

FOREIGN PATENT DOCUMENTS

| JP | 52-51641 | * | 4/1977 |
| JP | 6-199101 | * | 7/1994 |

* cited by examiner

Primary Examiner—Robert E. Pezzuto
Assistant Examiner—Thomas A. Beach
(74) Attorney, Agent, or Firm—Young & Basile, P.C.

(57) ABSTRACT

A caster supporting weight through a biasing device an elastomeric material, such as polyurethane, to elastomerically support the weight transmitted through the caster. The components are concisely related to each other, the elastic material is protected against damage, including excessive weight supporting forces, and in an embodiment of the invention, vertical caster adjustment is possible without affecting its elastomeric weight bearing characteristics.

6 Claims, 4 Drawing Sheets

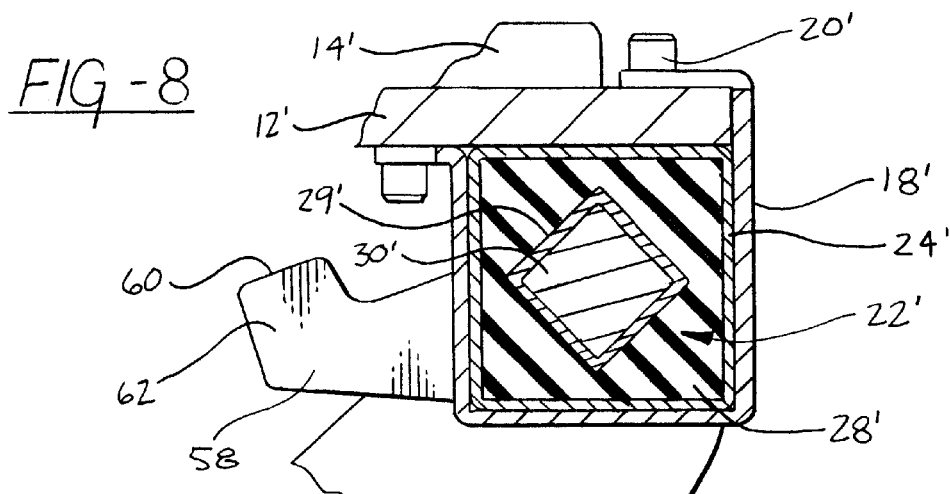
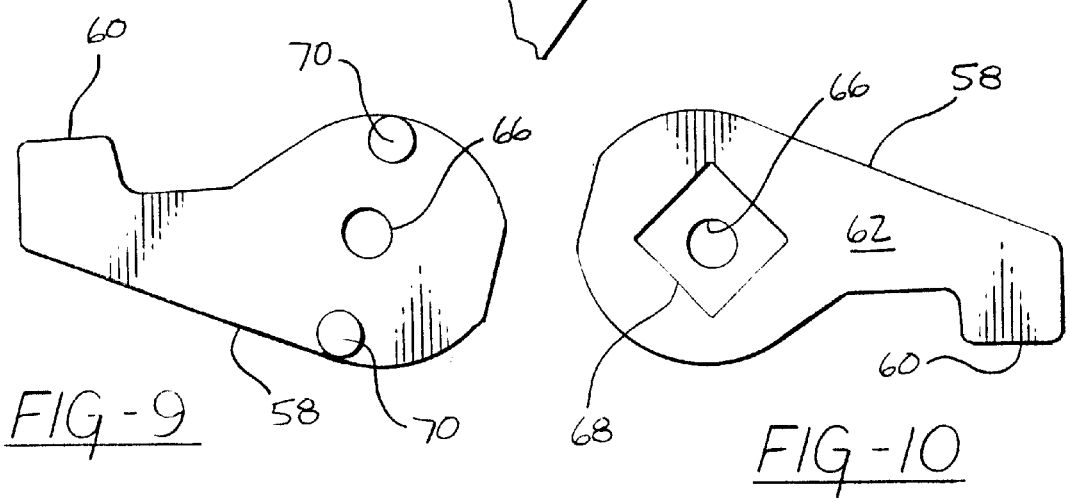
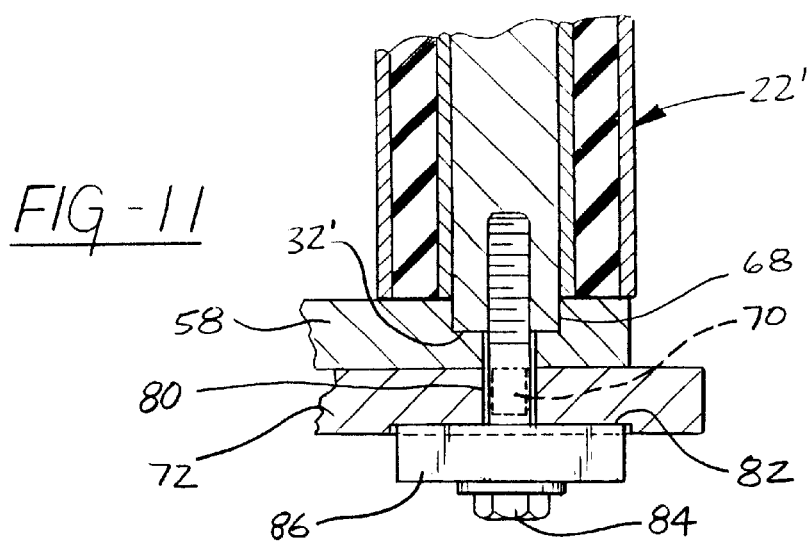

ELASTOMERIC BIASED CASTER

FIELD OF THE INVENTION

A caster having a wheel pivotally supported upon arms wherein the arms are elastomerically biased to absorb shock and improve the caster rolling characteristics.

BACKGROUND OF THE INVENTION

Heavy-duty casters are used to support relatively heavy loads transported by small lift trucks, material handling carts, and the like. By using biasing means to transmit the supported weight between the caster wheel and the caster body, the load bearing ability of the caster is improved resulting in smoother operation, ease of movement of the caster supported truck or vehicle, and improved truck travel operation due to caster wheel wear.

Steel compression springs have been used to bias resiliently supported casters, but such springs as are necessary to achieve the desired resilient supported characteristics are relatively large and not readily adaptable to many caster installations wherein the overall vertical dimension available for the caster is limited, and the vertical profile of the caster assembly must be concise.

Heretofore, it has not been possible to provide a low profile caster wherein the wheel is resiliently supported, the cost is relatively inexpensive, and the vertical caster dimension is relatively concise.

OBJECTS OF THE INVENTION

It is an object of the invention to provide a heavy-duty resiliently supported caster wherein the resilient caster characteristics are achieved through a torque transmitting polyurethane material wherein high loads may be elastomerically absorbed.

Another object of the invention is to provide a heavy-duty resiliently supported caster which is of a low vertical profile and may be installed in low profile environments without sacrifice of the elastomeric and shock absorbing weight characteristics of the caster.

SUMMARY OF THE INVENTION

The caster in accord with the invention includes a support plate affixed to the truck, forklift, or other structure to be supported by the caster. The caster body is mounted to the support plate either in a fixed relationship, or in a rotative relationship by the use of ball bearings if the caster is to be of the "pivoted" type. Such caster choices are well known.

The caster wheel is rotatably supported between a pair of pivoted caster arms mounted to the caster body. The upper end of the caster arms are attached to an insert which is part of the core of an elastomeric assembly wherein an elastic material, such as polyurethane, is bonded to an internal core, and is exteriorly bonded to a tubular housing, wherein a rotative relationship between the elastomeric material and the housing and the core is prevented.

The housing, which is of a non-circular transverse cross section, as is the core, is attached to the caster body intermediate the caster arms. The caster arms are attached to the ends of the core insert by a non-circular torque transmitting configuration, and held in this relationship by bolts threaded into the core ends. Stop projections are defined on the caster arms for engaging the caster body with excessive deformation of the elastomeric material takes place during operation.

The weight carried by the caster is transmitted through the elastomeric material in a torque transmitting manner, and in this way, the caster wheel is elastomerically related to the caster body to achieve the desired biased caster operation. As the ends of the elastic material are protected by the upper ends of the caster arms, the likelihood of damage to the elastomeric material is minimized, and the arrangement of components, as will be appreciated from the attached drawings, permits the entire caster assembly to be of a concise configuration and installable in applications wherein a low vertical profile is required.

In an embodiment of the invention, stop arms are bolted to the core insert in a non-rotative relationship and these stop arms will bear against the caster body if excessive elastomer deformation occurs. The upper ends of the stop arms include a torque coupling receivable within a slot defined in the upper end of the caster arms and a toothed washer mounted upon the insert bolts cooperating with teeth defined in the outer surface of the caster arms permits the caster arms to be adjustably positioned relative to the caster body and support. In this manner, the vertical height of the caster can be easily adjusted to accommodate the caster to a particular installation without requiring major modification.

BRIEF DESCRIPTION OF THE DRAWINGS

The aforementioned objects of the invention and an understanding of various embodiments thereof will be appreciated from the following description and accompanying drawings wherein:

FIG. 8 is an elevational sectional view as taken along Section 8—8 of FIG. 7, FIG. 9 is an elevational view of the outer side of a stop dog used with the embodiment of FIG. 6, FIG. 10 is an elevational view of the inner side of the stop dog of FIG. 9, and FIG. 11 is an elevational view of the end of the elastomeric assembly as taken along Section 11—11 of FIG. 6.

DESCRIPTION OF THE PREFERRED EMBODIMENTS

Figure 1:
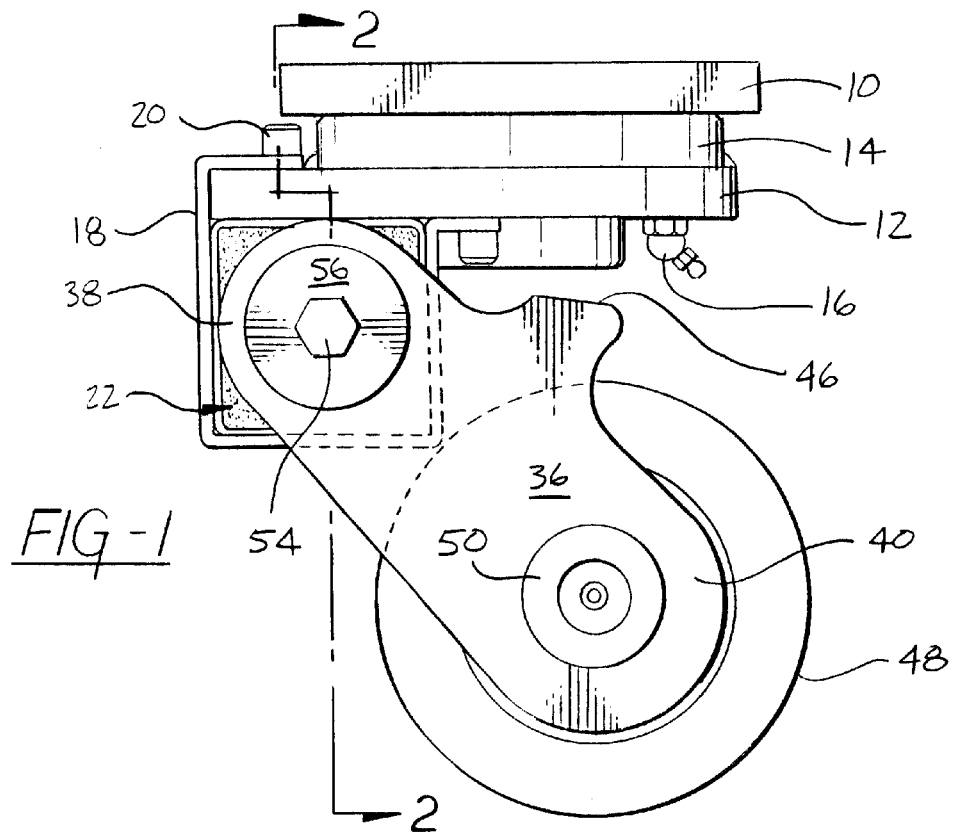
FIG. 1 is a side elevational view of a caster in accord with the invention.

The elevational view of FIG. 1 illustrates a typical example of the assembly of components producing a caster utilizing the inventive concepts. A support plate 10 is attached to the vehicle being supported by the caster, such as a small lift truck, material handling container, hand truck, or the like. This type of caster is particularly useful with small forklift trucks of the non-ridable type wherein relatively heavy loads are carried and the forklift truck vertical dimension is low.

The caster body is represented at 12 and is attached to the support plate 10 by bearing structure at 14. The bearing 14 may constitute merely a plate whereby the caster body 12 is rigidly attached to the support plate 10, but in many instances, the bearing 14 will be of the anti-friction type wherein the caster body 12 is rotatably supported relative to the plate 10, as is well known in the caster art. A grease fitting 16 serves to lubricate the bearing 14 if it is of the rotative type.

Figure 3:
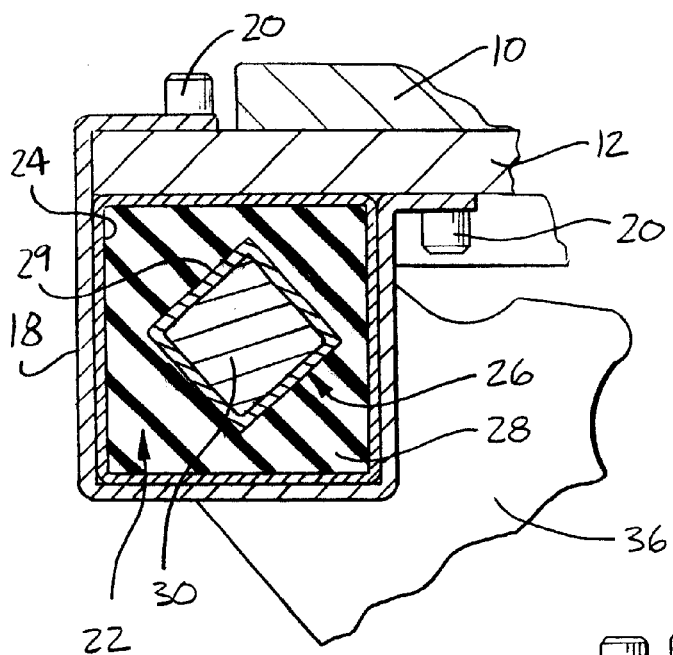
FIG. 3 is a detailed elevational sectional view taken through the elastomeric assembly along Section 3—3 of FIG. 2.
Figure 4:
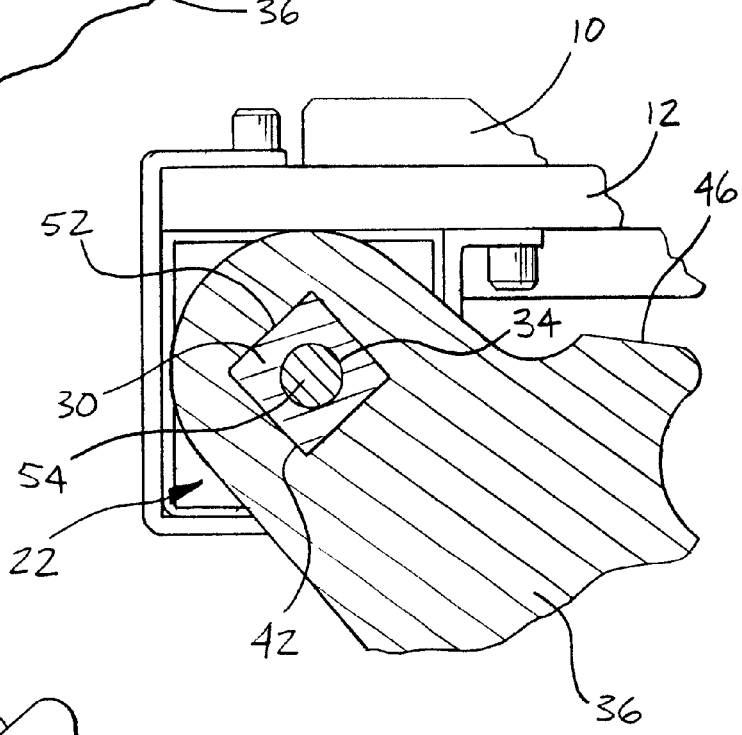
FIG. 4 is an enlarged detail elevational sectional view of a caster arm upper end taken along Section 4—4 of FIG. 2.

A tubular box frame 18 of a length less than the width of the caster body 12 is attached to the caster body by bolts 20. As will be appreciated from FIGS. 1 and 3, the box frame 18 defines a square void which closely receives the elastomer assembly 22.

Figure 2:
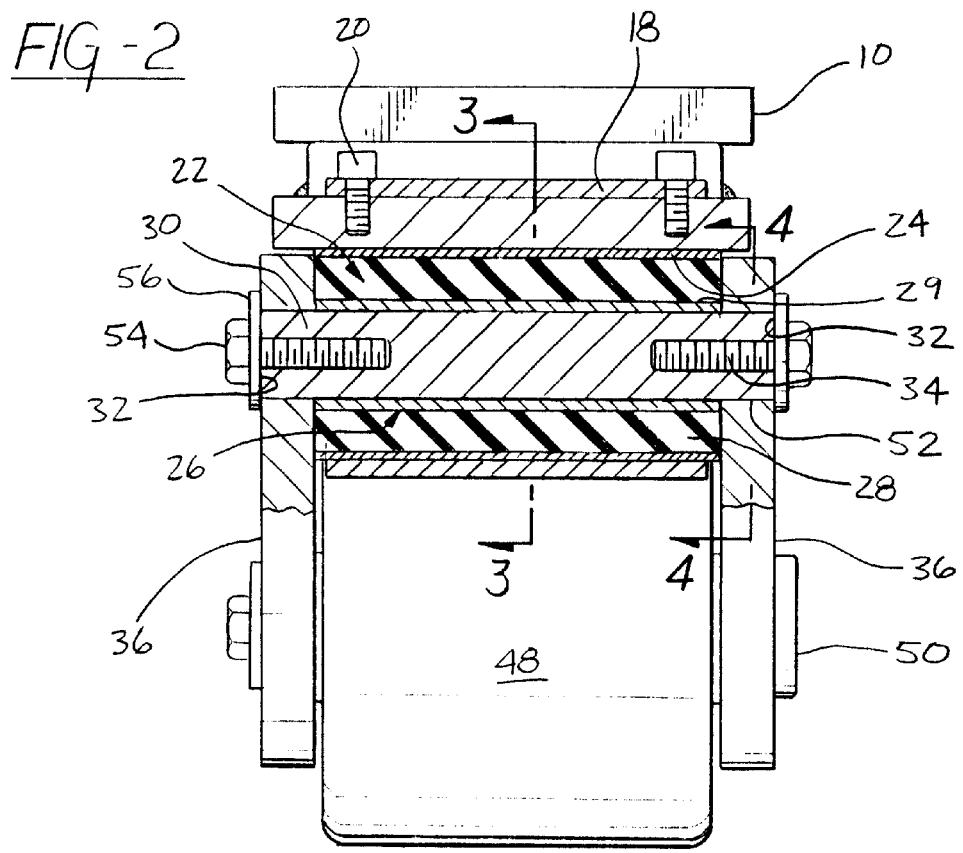
FIG. 2 is an elevational view taken along Section 2—2 of FIG. 1.

The elastomer assembly 22 includes a tubular housing 24 which, in the disclosed embodiment, is of approximately a square transverse cross section and of a length as will be appreciated from FIG. 2. Internally, the elastomeric assembly core 26 is centrally located within the tubular housing 24 and is of a square configuration, FIG. 3, and is of a smaller dimension than the housing 24 such that the void between the housing 24 and core 26 can be filled with an elastomeric material 28, such as polyurethane. The elastomeric polyurethane 28 is preferably bonded to the inside of the tubular housing 24 and the exterior configuration of the core 26 whereby relative limited rotation between the core 26 and tubular housing 24 is permitted by the elastomeric characteristic of the polyurethane, but such elastomeric deformation is resisted.

The core 26 consists of a square tubular element 29 of an elongated configuration and a square insert 30 closely fits within the element 29 and is of a length greater than the element 29 as will be appreciated from FIG. 2. The ends of the insert 30 are represented at 32, and coaxial threaded holes 34 are defined in each of the insert ends.

Figure 5:
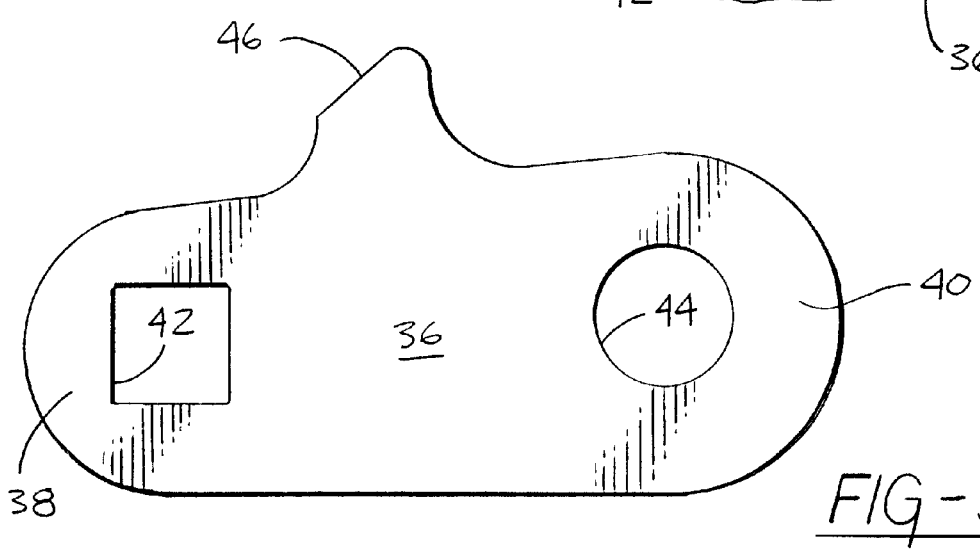
FIG. 5 is an elevational view of one of the caster arms used in the embodiment of FIG. 1.

A pair of identical caster arms 36 are mounted upon the insert 30, each of the caster arms including an upper end 38 and a lower end 40. As clearly indicated in FIG. 5, the caster upper end 38 includes a square hole 42, and the lower end 40 includes a round hole 44. A stop projection is integrally defined on the caster arms 36 forming the stop projection surface 46. The caster wheel 48, formed of metal or a synthetic material, is rotatably located between the caster arms 36 upon an axle 50.

As will be appreciated from FIG. 2, the length of the insert 30 is such that the insert end extensions 52, which are of the square configuration of the entire length of the insert 30, extend beyond the ends of the elastomer 28 and the housing 24. Accordingly, the caster arms 36 are placed upon the insert extensions 52 by holes 42, and bolts 54 threaded into insert holes 34 maintain the caster arms 36 in a non-rotatable relationship to the insert 30.

Weight placed upon the support plate 10 is transferred through the elastomer 28 to the caster arms 36 and wheel 48. This weight bearing of the caster tends to rotate the core 26 relative to the housing 24, and such rotation is resisted by the elastomeric material 28 which deforms in a rotatable manner about the axis of the insert 30. Of course, such rotation is limited and the flexible and elastomeric character of the elastomer 28 provides a resilient biasing support of the wheel 48 capable of resisting shock and uneven floor surfaces. Excessive weight applied to the caster causes engagement of the caster arm stop surface 46 with the underside of the body 12 so as not to overstress the elastomeric material.

The disclosed arrangement of components permits high forces to be resiliently supported in a relatively low profile caster.

The caster embodiment shown in FIGS. 6–11 has many similarities to the previously described caster and similar components are indicated by primed reference numerals. In the embodiment of FIGS. 6–11, the elastomeric assembly 22' is identical to that previously described but this embodiment uses a pair of stop dogs 58, the opposite sides of one of which is shown in FIGS. 9 and 10. The caster uses two stop dogs 58 which are mirror images of each other, and each stop dog includes an inner side 62 and an outer side 64. A bolt hole 66 extends through the stop dogs and on the inner side 62, a square countersunk recess 68 is formed concentric with respect to the bolt hole 66. The recess 68 does not extend completely through the associated stop dog as will be appreciated from FIGS. 7 and 9.

Each of the stop dogs 58 includes a pair of spaced studs or projections 70 extending from side 64 as will be appreciated from FIG. 9. The studs 70 are in radial alignment with each other with respect to the center of the associated bolt hole 66, and are used to establish a torque transmitting coupling with the caster arms as later described.

The caster arms 72 are located upon each side of the caster and each includes an offset 74 to accommodate the greater width of the caster resulting from the use of the stop dogs 58. Each caster arm 72 includes an axle 76 upon which the caster wheel 78 is mounted.

Figure 6:
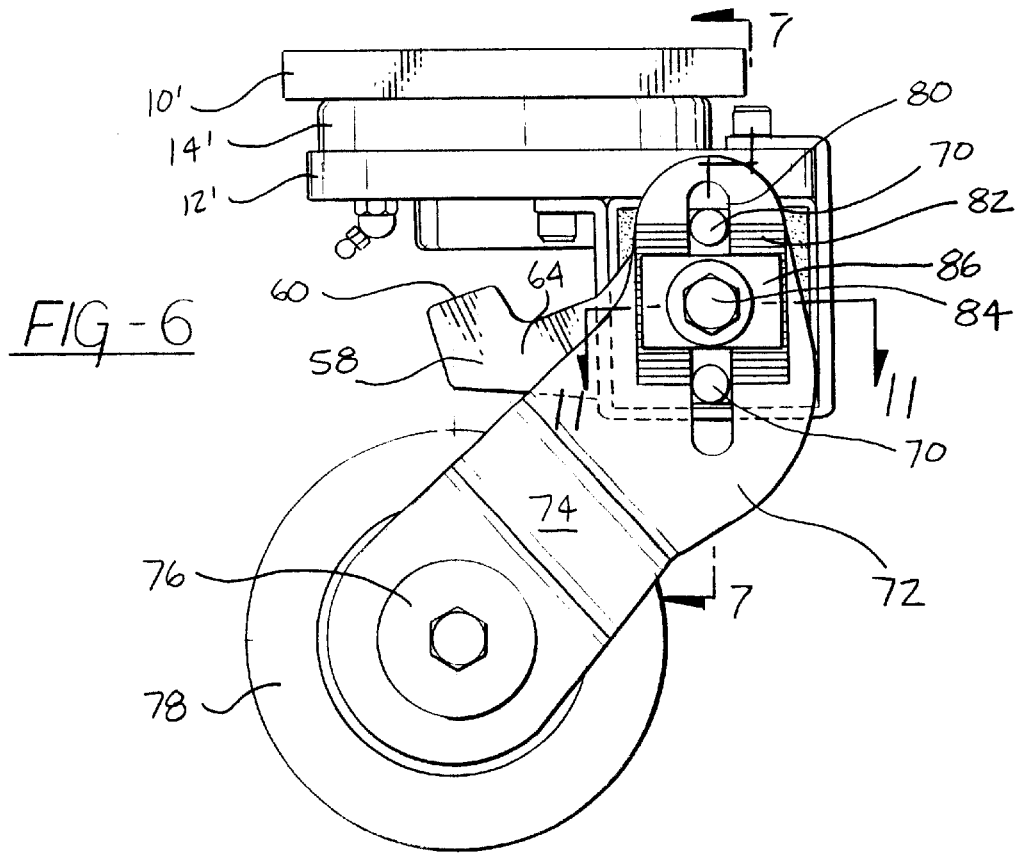
FIG. 6 is an elevational view of another embodiment of the caster invention wherein the vertical height of the caster is adjustable.
Figure 7:
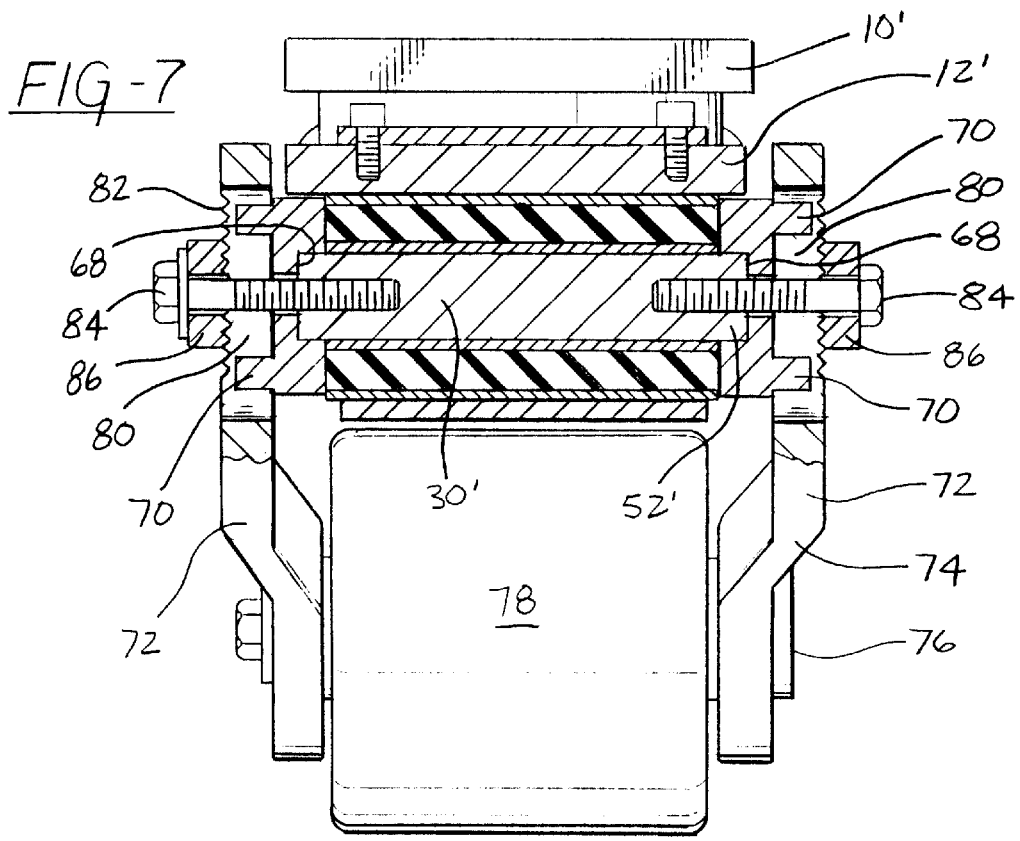
FIG. 7 is an elevational sectional view as taken through Section 7—7 of FIG. 6.

As will be noted from FIGS. 6 and 7, a vertical slot 80 is defined in the upper end of each caster arm 72. The length of the slot 80 is greater than the separation between the studs 70 on a common stop dog, and the studs 70 are received within a slot 80 as will be appreciated in FIGS. 6 and 7. A plurality of teeth or serrations 82 are defined on the outer side of each caster arm 72 adjacent the slot 80, and the caster arms are attached to the caster body 12' by the bolts 84 which pass through the bolt holes 66 and are threaded into the ends of the insert 30'. A toothed or serrated washer 86 of a rectangular configuration is engaged by the head of the bolt 84 which engages the caster arm teeth 82 wherein tightening of the bolts 84 prevent vertical movement of the caster arms 72 with respect to the caster body 12'.

When adjusting the vertical height of the caster assembly shown in FIGS. 6–11, the bolts 84 are loosened to such an extent that the washers 86 are not engaging the teeth 82 of the caster arms 72. Accordingly, the length of the slots 80 will permit the caster arms to be moved vertically as the studs 70 slide within the slots 80. Upon tightening of the bolts 84, the washers 86 engage the teeth 82 and force the caster arms 72 towards the insert ends 32'. As the square insert end extensions 52' are closely received within the caster arm recesses 68, the caster arms are torsionally coupled to the core insert 30', and the reception of the stop dog studs 70 into the caster arm slots 80 produces a torque transmitting coupling between the stop dogs and caster arms which permits the torque forces imposed on the caster arms to be transmitted to the elastomeric assembly 22', and in this manner, vertical adjustment of the height of the caster is possible without adversely affecting the elastic characteristics of the elastomeric assembly 22'. As the stop dogs 58 rotate with the caster arms 72, excessive movement of the caster arms upwardly is terminated by engagement of the stop surfaces 60 with the caster body 12'.

It will be appreciated that various modifications to the inventive concepts may be apparent to those skilled in the art without departing from the spirit and scope of the invention. Terms such as "upper" and "lower" as used in the claims are only for the purpose of defining relative relationships and are not to be considered limiting.

What is claimed is:

1. An elastomerically biased caster comprising, in combination, a support adapted to be mounted upon structure supported by the caster, a caster body mounted upon said support, an elongated tubular housing defined on said caster body having ends and a non-circular inner transverse cross section, an exteriorly non-circular core longitudinally extending through said housing, said core having ends, stop projections defined on said arms adapted to engage said caster body upon predetermined movement of said arms toward said caster body, a caster arm having upper and lower ends affixed to each end of said core at said upper end, a caster wheel rotatably interposed between said arms' lower ends, an elastomeric material within said tubular housing closely confirming to the interior configuration of said housing and the exterior configuration of said core in a non-movable surface relationship thereto, said elastomeric material resiliently transferring weight from said support to said caster, said non-circular core comprising a tubular element having a polygonal transverse cross section and an elongated metal insert having a polygonal transverse cross section corresponding to and snugly fitting within said element, said insert having ends extending beyond the length of said tubular housing, said arms' upper end being non-rotatably affixed to said insert ends.

2. An elastomerically biased caster comprising, in combination, a support adapted to be mounted upon structure supported by the caster, a caster body mounted upon said support, an elongated tubular housing defined on said caster body having ends and a non-circular inner transverse cross section, an exteriorly non-circular core longitudinally extending through said housing, said core having ends, a caster arm having upper and lower ends affixed to each end of said core at said upper end, a caster wheel rotatably interposed between said arms' lower ends, an elastomeric material within said tubular housing closely confirming to the interior configuration of said housing and the exterior configuration of said core in a non-movable surface relationship thereto, said elastomeric material resiliently transferring weight from said support to said caster, said non-circular core comprising a tubular element having a polygonal transverse cross section and an elongated metal insert having a polygonal transverse cross section corresponding to and snugly fitting within said element, said insert having ends extending beyond the length of said tubular housing, said arms' upper end being non-rotatably affixed to said insert ends, an elongated stop dog having inner and outer ends mounted upon at least one of said insert ends at said stop dog inner end in a non-rotative relationship thereto and having a stop surface defined adjacent said stop doug outer end adapted to engage said caster body upon predetermining movement of said arms toward said caster body.

3. In an elastomerically biased caster as in claim 2, a stop dog non-rotatably mounted upon each end of said insert.

4. An elastomerically biased caster comprising, in combination, a support adapted to be mounted upon structure supported by the caster, a caster body mounted upon said support, an elongated tubular housing defined on said caster body having ends and a non-circular inner transverse cross section, an exteriorly non-circular core longitudinally extending through said housing, said core having ends, a caster arm having upper and lower ends affixed to each end of said core at said upper end, a caster wheel rotatably interposed between said arms' lower ends, an elastomeric material within said tubular housing closely confirming to the interior configuration of said housing and the exterior configuration of said core in a non-movable surface relationship thereto, said elastomeric material resiliently transferring weight from said support to said caster, said non-circular core comprising a tubular element having a polygonal transverse cross section and an elongated metal insert having a polygonal transverse cross section corresponding to and snugly fitting within said element, said insert having ends extending beyond the length of said tubular housing, said arms' upper end being non-rotatably affixed to said insert ends, a bolt threaded into each end of said insert, and adjustment means associated with said bolts interposed between said bolts and said arms whereby said arms may be vertically adjusted relative to said insert.

5. In an elastomerically biased caster as in claim 3, a vertical slot defined in said arms' upper ends, a torque transmitting coupling interposed between said stop dogs' inner ends received within said arms' slots, bolts threaded into said ends of said insert extending through said slots, said slots permitting vertical adjustment of said arms' upper ends on said stop dogs' inner ends, and friction means interposed between said bolts and arms' upper ends adapted to lock said arms' upper ends relative to said insert to selectively vertically position said arms to said caster body.

6. In an elastomerically biased caster as in claim 5, said friction means comprising a toothed washer received on said bolts and engageable toothed surfaces defined on said arms' upper ends adjacent the associated slot.

* * * * *

UNITED STATES PATENT AND TRADEMARK OFFICE
CERTIFICATE OF CORRECTION

PATENT NO. : 6,499,184 B2
DATED : September 31, 2002
INVENTOR(S) : Plate

It is certified that error appears in the above-identified patent and that said Letters Patent is hereby corrected as shown below:

Column 5,
Line 8, after ",", insert -- a caster arm having upper and lower ends affixed to each end of said core at said upper end --.
Lines 11 and 12, delete "a caster arm having upper and lower ends affixed to each end of said core at said upper end,".

Column 6,
Line 3, delete "doug" and insert -- dog --.

Signed and Sealed this

Eleventh Day of March, 2003

JAMES E. ROGAN
*Director of the United States Patent and Trademark Office*